July 20, 1948.　　K. R. ELDREDGE ET AL　　2,445,318

MAGNETOSTRICTIVE PICKUP UNIT

Filed Oct. 23, 1943

INVENTORS
KENNETH R. ELDREDGE
ALF HUNDERE
JOHN H. MACPHERSON, JR.

BY *J. N. Adams*
ATTORNEY

Patented July 20, 1948

2,445,318

UNITED STATES PATENT OFFICE 2,445,318

MAGNETOSTRICTIVE PICKUP UNIT

Kenneth R. Eldredge, Alf Hundere, and John H. Macpherson, Jr., Berkeley, Calif., assignors, by mesne assignments, to California Research Corporation, San Francisco, Calif., a corporation of Delaware Application October 23, 1943, Serial No. 507,466

12 Claims. (Cl. 171—209)

This invention relates to a means for determining the intensity of detonation in a cylinder of an internal combustion engine without requiring an opening into the combustion chamber, and particularly refers to a device in which the vibration set up by detonation in the cylinder is impressed upon a rigid immovable member carrying a magnetic flux to modify a magnetic property such as conductivity, and induce an electromotive force in a suitable coil associated with or linking the flux path.

In the United States Patent No. 2,269,760, issued January 13, 1942, to Kenneth R. Eldredge, one of the inventors herein, a rod of magnetostrictive material was used in a detonation pickup unit of this general type. Stresses were set up in an elongated rod by the pressure of combustion gases against a diaphragm secured in an opening in the cylinder wall of an engine. Oftentimes it is inconvenient to provide a suitable opening in the engine for a detonation indicator of the type just described and this invention comprehends broadly the provision of a detonation pickup unit which may be secured to the outside of an internal combustion engine and which will utilize magnetostrictive phenomena to induce varying electromotive forces in a winding, these forces being measurable directly by suitable known indicating apparatus.

Another type of detonation pickup unit which has been proposed is that of Patent No. 2,275,675, issued March 10, 1942, to C. D. Draper et al. That type is secured to the outside of an engine cylinder and utilizes a so-called "seismic mass" supported upon a flexible diaphragm or its equivalent to vary the air gap in a magnetic circuit, the latter provided with a winding and a source of flux, to induce varying voltages in the winding. Generally speaking, devices which depend upon a varying air gap that is of a length adequate to avoid saturation effects will be found to have a relatively low effective output and consequently require a greater degree of subsequent amplification to operate any knock indication device.

The present invention does not utilize a diaphragm exposed to combustion gases as in the Eldredge patent cited, nor does it use a variable air gap as in the Draper patent just described. Although certain embodiments may utilize a very short air gap in a magnetic circuit, the length of this gap is unchanged in operation, the effective output of the unit being due to mechanical stresses in a magnetostrictive element which modify all or part of its magnetic conductivity so that if an initially constant magnetic flux is passed through the element variations will be caused in said flux due to detonation vibrations, these changes in flux being detected by their effect upon a winding associated with or linking the flux path. In other forms the flux path may be entirely closed and a composite element having parts of dissimilar magnetostrictive characteristics or non-linear magnetostrictive characteristics employed.

It is an object of this invention to provide a detonation pickup unit which may be secured to the outside of an internal combustion engine such as a cylinder, which has no moving parts, and which will retain its output characteristics without danger of fatigue or failure of thin sections, diaphragms and the like.

Another object is to provide a relatively simple detonation pickup unit which is susceptible of manufacture in large numbers and with a minimum of critical materials, close tolerances and the like.

Another object is to provide a detonation pickup unit which may be entirely sealed and, if desired, filled with a plastic or semi-plastic insulating material, completely to insulate the portions of the unit which carry electric currents.

These and other objects of this invention will be further apparent from the following description and from the attached drawing which forms a part of this specification and illustrates a preferred embodiment and an alternative form of this invention.

Figure 1:
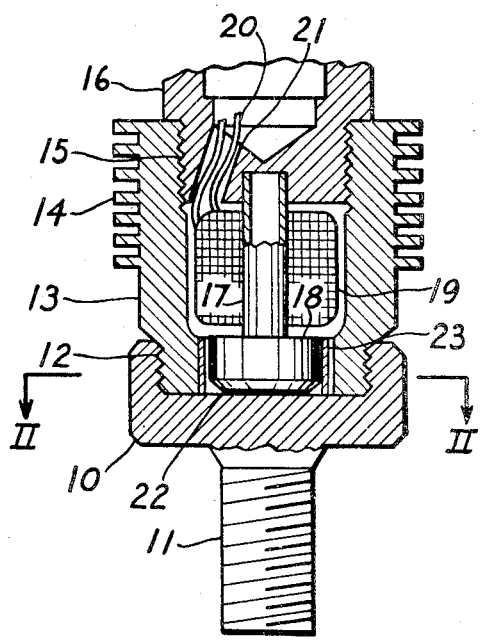
Figure 1 is a vertical and part-sectional view to an enlarged scale of a detonation pickup unit embodying this invention.

Referring to the drawing and particularly to Figure 1, reference numeral 10 designates a base provided with a threaded stud 11 which may be secured in a suitable tapped hole on some part of an engine, preferably mounted upon and at right angles to the axis of the cylinder bore. The upper end of base 10 is threaded as at 12 to receive a rigid hollow cylindrical body or housing 13, the latter preferably provided on its outer surface with heat radiating fins 14. The upper end of body 13 is preferably threaded as at 15 to receive a suitable plug 16 of paramagnetic material, the latter serving to support within body 13 an elongated magnetostrictive element 17. In the example, magnetostrictive element 17 is supported at its upper end only, the free or unsupported end being provided with an enlargement or weight 18, the latter being of a paramagnetic material for reasons which will be pointed out below. The mass and proportions of the system comprising element 17 and weight 18 should be such that longitudinal vibrations will be most readily set up therein by the detonation frequency of the engine on which the device is to be used. Usually this frequency is in the neighborhood of 6,000 cycles per second.

In the form shown, element 17 is illustrated as being hollow and may consist of an alloy of about 52% nickel and 48% iron with only traces of other substances suitably heat treated so that its conductivity for magnetic flux will vary as desired by stresses caused by forced longitudinal vibrations set up in element 17 when the housing comprising base 10, cylinder 13 and plug 16 is vibrated by detonation in the cylinder to which the housing is attached. Surrounding element 17 is a winding 19 of insulated wire which is provided with leads 20 extending upwardly through a suitable passage 21 in plug 16 to a terminal in the upper part of the plug (not shown).

Figure 2:
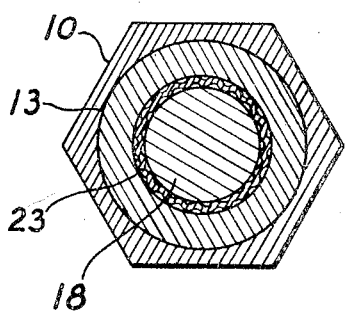
Figure 2 is a transverse sectional view on the line II—II of Figure 1.

Means are included within the body of the unit for impressing an initially constant magnetic flux upon element 17, for example, hollow cylinder 13 may be made of a ferrous or other alloy which is permanently magnetized. Weight 18 upon element 17 is desirably spaced a short distance above the upper face of base 10 as at 22, for example 0.002 inch, this spacing remaining substantially unvarying during the operation of the device. In the embodiment shown in Figures 1 and 2, in order to provide a completely closed metallic magnetic flux path, a thin corrugated strip of paramagnetic material is placed between the periphery of weight 18 and the lower cylindrical bore of hollow body 13. This will permit undisturbed longitudinal vibration of the element 17 with its accompanying weight 18. This latter construction, however, is not required and may be omitted if desired, as the space 22 between the end face of weight 18 and the upper face of base 10 and the annular clearance, for example 0.0005 inch, between the periphery of weight 18 and the bore of body 13 may be chosen to provide a magnetic flux path which will have a lower reluctance than that of the remainder of the magnetic flux circuit.

It will be found that the arrangement just described will be substantially insensitive to transverse vibrations due to bending of element 17, for tensile stresses at one side of element 17 which might tend to change its reluctance to the passage of magnetic flux would be compensated by the effect of compressive stresses simultaneously occurring at the opposite side of said element. Alternatively, element 17 may be heat treated in a known manner, and the flux density chosen so that the element will be non-linear, for example so that it will be very sensitive to compression and not at all sensitive to tension. Under these conditions, bending stresses would be indicated as a variation in compression with the tension side of the element ineffective to modify its flux conductivity, thus making the unit sensitive to transverse as well as longitudinal vibrations or components thereof. Desirably, but not necessarily, the space surrounding winding 19 within the hollow rigid body 13 may be filled with a plastic or semi-plastic insulating compound which will serve not only to equalize the temperature throughout the entire unit but will also insure the electrical insulation of the winding 19.

Figure 3:
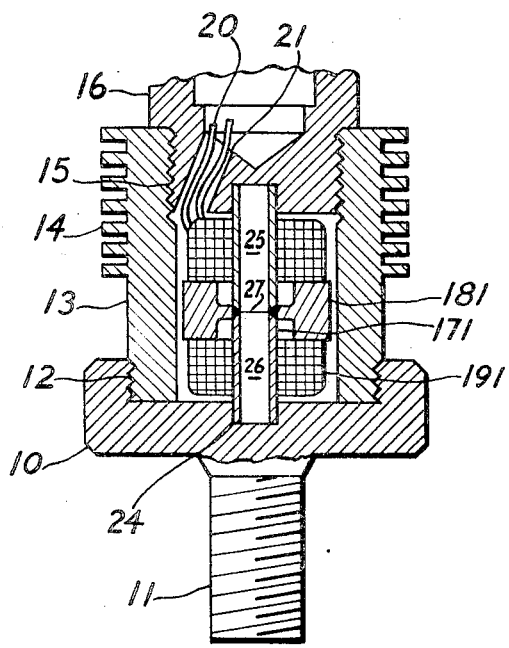
Figure 3 is a vertical part-sectional view to an enlarged scale of an alternative form of this device in which both ends of the magnetostrictive element are rigidly supported.

In the embodiment of Figure 3 the base and body are substantially identical to those of Figure 1, but the elongated magnetostrictive element 171 is supported between plug 16 and a suitable connection with base 10 as at 24. The upper and lower portions of element 171 are of materials having dissimilar magnetostrictive characteristics, for example the upper end 25 may be composed of pure nickel which conducts a magnetic flux better when under compression than when under tension and the lower may be composed of approximately 50% nickel and 50% iron which conducts magnetic flux better under tension than under compression. Alternatively, element 171 may be of a homogeneous material with its two portions 25 and 26 heat treated to give dissimilar or non-linear magnetostrictive characteristics according to procedures which are well known to one skilled in this art.

The weight element 181 for the embodiment of Figure 3 is desirably positioned intermediate the ends of element 171 and, in this example, is shown approximately midway and connected to 171 at the weld or juncture 27 between the upper end portion 25 and the lower end portion 26. For convenience, the winding 191 of this embodiment may be divided into two portions positioned respectively above and below the weight element 181. This arrangement of weight 181 will cause simultaneous compressive stress in one section of element 171 and tensile stress in the other section, depending on the direction in which weight 181 tends to move under longitudinal vibration of the system. Thus the effect on the flux conductivities of the dissimilar magnetostrictive materials are additive, giving a greater output from the unit.

Although in the two specific examples illustrated separate weight elements or at least enlargements 18 and 181 of the magnetostrictive elements 17 and 171, respectively, are shown, it is apparent to one skilled in the art that the mass of the magnetostrictive element per se may be chosen to give the desired vibration frequency response. Accordingly it is understood that the weight member, where separately enumerated, may be included within the body or mass of the rod or element and not necessarily separate therefrom, and it is intended that the appended claims shall be so construed and interpreted.

It has been found that the detonation response characteristics of apparatus embodying this invention are superior to those of devices secured to the outside of the engine cylinder and in which magnetic gaps are varied by moving diaphragms, weights or the like, and are substantially as satisfactory as those in which a diaphragm is exposed directly to the combustion gases, the diaphragm serving to impress forces corresponding to pressure variations on a magnetostrictive element such as the rod of the Eldredge Patent No. 2,269,760.

The essential features of the present invention appear to reside in the provision of a rigid housing within which are an element of magnetostrictive material, inertia means for the elements or included within its mass to make it responsive to detonation in the engine, means for impressing an initially constant magnetic flux upon the element, the stresses due to detonation vibrations serving to vary the reluctance of the element to the passage of this flux, and means such as a winding linking or intersecting the path of the flux in which electromotive forces corresponding to the flux changes may be induced.

Although two specific examples of this invention have been described and illustrated, it is obvious that numerous changes could be made without departing from the invention and all such modifications and changes that come within the scope of the appended claims are embraced thereby.

We claim:

1. Apparatus for detecting detonation in a cylinder of an internal combustion engine, comprising a rigid housing of paramagnetic material adapted to be directly and rigidly attached to the outer wall of said cylinder, a rod of magnetostrictive material secured in said housing, a weight member supported by said rod, a magnetic circuit including flux producing means and said rod, a winding enclosing a portion of said magnetic circuit, the flux in said circuit varying with stresses due to forced vibrations in said rod caused by detonation in said engine cylinder to induce correspondingly varying electromotive forces in said winding.

2. Apparatus according to claim 1 in which said magnetic flux path is of constant length.

3. Apparatus according to claim 1 with the addition of paramagnetic means in said housing closing said flux path.

4. Apparatus according to claim 1 in which said magnetic circuit includes said weight, said weight being of paramagnetic material and spaced from said housing to form an unvarying low reluctance gap in said magnetic circuit.

5. Apparatus according to claim 1 in which said weight is positioned on an unsupported end of said rod.

6. Apparatus according to claim 1 in which said rod is supported at both ends in said housing and said weight is positioned intermediate said ends.

7. Apparatus according to claim 1 in which opposite end portions of said rod are of dissimilar magnetostrictive characteristics, both ends of said rod being supported in said housing and said weight is positioned intermediate the ends of said rod.

8. Apparatus for detecting detonation in a cylinder of an internal combustion engine, comprising a housing adapted to be directly and rigidly attached to the outer wall of said cylinder and independent of any fluid pressure communication with the interior of said cylinder, a magnetostrictive element comprising a seismic mass secured in said housing to vibrate at a frequency approximating the detonation frequency characteristics of said engine, means for impressing a magnetic flux upon said element, and a winding linking said flux, so constructed and arranged that variations in the magnetic flux conductivity of said element due to mechanical vibrations set up by detonation in said cylinder and mechanically transmitted through the wall thereof to said element will induce correspondingly varying electromotive forces in said winding.

9. Apparatus according to claim 8 in which said magnetostrictive element is elongated and has similar non-linear characteristics at both ends.

10. Apparatus for detecting detonation in an internal combustion engine comprising a magnetostrictive element having inertia means included within the mass of said element, means for positioning said element upon a wall of said engine so that it is unresponsive directly to normal pressure changes in a cylinder of said engine but is free to vibrate at a frequency approximating the detonation frequency characteristics of said engine, means for impressing a substantially constant magnetic flux upon said element in a closed path, and a winding linking said flux path, so constructed and arranged that variations in the magnetic flux conductivity of at least part of said element due to internal stresses set up therein by detonation in said engine will induce correspondingly varying electromotive forces in said winding.

11. Apparatus for detecting detonation in an internal combustion engine, comprising a housing of paramagnetic material, means for mounting said housing rigidly and exteriorly of said engine, an elongated magnetostrictive element rigidly secured in said housing, a mass of paramagnetic material at one end of said element and cooperating with said housing to provide a magnetic flux path of unvarying length through said housing and said magnetostrictive element, said mass also acting mechanically to stress said magnetostrictive element longitudinally in accordance with vibrations in said engine due to detonation, and a winding in said housing linking said flux path, at least one element of said apparatus being permanently magnetized to provide a substantially constant source of magnetic flux.

12. Apparatus for detecting detonation in an internal combustion engine, comprising a housing of paramagnetic material, means for mounting said housing rigidly and exteriorly of said engine, an elongated magnetostrictive element rigidly secured in said housing, said element comprising a seismic mass cooperating with said housing to provide a magnetic flux path of unvarying length and adapted to be stressed longitudinally in accordance with vibrations in said engine due to detonation, and a winding in said housing linking said flux path, at least one element in said flux path being permanently magnetized to provide a substantially constant source of magnetic flux.

KENNETH R. ELDREDGE.
ALF HUNDERE.
JOHN H. MACPHERSON, Jr.

REFERENCES CITED

The following references are of record in the file of this patent:

UNITED STATES PATENTS

| Number | Name | Date |
| --- | --- | --- |
| 2,269,760 | Eldredge | Jan. 13, 1942 |
| 2,291,045 | Lancor | July 28, 1942 |
| 2,251,436 | Bentley et al. | Aug. 5, 1941 |
| 2,275,675 | Draper et al. | Mar. 10, 1942 |